US011138547B2

(12) United States Patent
Sauerwein, Jr.

(10) Patent No.: US 11,138,547 B2
(45) Date of Patent: Oct. 5, 2021

(54) BI-MODAL COMMUNICATION SYSTEM FOR SECURE GOODS TRACKING AND METHODS OF USING THE SAME

(71) Applicant: Hand Held Products, Inc., Fort Mill, SC (US)

(72) Inventor: James Timothy Sauerwein, Jr., Charlotte, NC (US)

(73) Assignee: Hand Held Products, Inc., Fort Mill, SC (US)

( * ) Notice: Subject to any disclaimer, the term of this patent is extended or adjusted under 35 U.S.C. 154(b) by 886 days.

(21) Appl. No.: 15/722,106

(22) Filed: Oct. 2, 2017

(65) Prior Publication Data
US 2019/0102732 A1 Apr. 4, 2019

(51) Int. Cl.
*G06Q 10/08* (2012.01)
*H04M 11/00* (2006.01)
(Continued)

(52) U.S. Cl.
CPC ......... *G06Q 10/0833* (2013.01); *G06Q 10/08* (2013.01); *H04M 11/002* (2013.01); *H04W 4/70* (2018.02); *H04W 4/80* (2018.02)

(58) Field of Classification Search
CPC ..... G06Q 10/0833; G06Q 10/08; H04W 4/70; H04W 4/80; H04M 11/002
See application file for complete search history.

(56) References Cited

U.S. PATENT DOCUMENTS 6,289,389 B1 9/2001 Kikinis
6,801,777 B2 * 10/2004 Rusch ............... H04W 48/18
455/452.2
(Continued)

FOREIGN PATENT DOCUMENTS

EP 1422871 A2 5/2004
EP 2393055 A1 12/2011
(Continued)

OTHER PUBLICATIONS

Annex to the communication dated Aug. 12, 2020 for EP Application No. 18198066.
(Continued)

*Primary Examiner* — James R Sheleheda
(74) *Attorney, Agent, or Firm* — Alston & Bird LLP

(57) ABSTRACT

Example methods, apparatuses and systems are disclosed for monitoring and tracking goods flowing through a supply chain. In this regard, goods may be associated with one or more monitoring nodes for monitoring various parameters such as conditions associated with an environment of the goods. In this regard, the monitoring nodes transmits telemetry data monitored by the monitoring nodes, via edge devices or gateway nodes to a server. In accordance with various embodiments illustrated herein, based on an analysis of status information and a network connection quality, associated with transmission of telemetry data packets over a communication network, the data packets under transmission, may be altered by processing the data packets locally and intermediately at the edge devices before sending to the server. The data packets may be altered such that, in an operation, only a portion of data packet including relevant contextual information associated with the telemetry data may be transmitted to the server.

20 Claims, 7 Drawing Sheets

(51) Int. Cl.
*H04W 4/70* (2018.01)
*H04W 4/80* (2018.01)

(56) References Cited

U.S. PATENT DOCUMENTS

| | | | |
|---|---|---|---|
| 7,142,534 B1* | 11/2006 | Whent | H04L 29/06027 370/352 |
| 7,551,563 B2 | 6/2009 | Beadle et al. | |
| 7,590,055 B2* | 9/2009 | Segel | H04L 45/22 370/228 |
| 7,945,678 B1 | 5/2011 | Skene | |
| 8,417,833 B1 | 4/2013 | Amdahl | |
| 8,437,307 B2* | 5/2013 | Chaturvedi | H04W 4/00 370/331 |
| 10,728,149 B1* | 7/2020 | Ramanujan | H04L 45/56 |
| 2003/0043732 A1* | 3/2003 | Walton | H04L 25/0204 370/208 |
| 2004/0090923 A1* | 5/2004 | Kan | H04L 43/00 370/252 |
| 2011/0291828 A1* | 12/2011 | Walker | H04W 4/027 340/539.27 |
| 2011/0295560 A1* | 12/2011 | Crockford | G16H 20/30 702/187 |
| 2016/0048114 A1* | 2/2016 | Matthieu | H04L 12/2803 700/83 |
| 2018/0343593 A1* | 11/2018 | Singh | H04W 48/18 |
| 2019/0281132 A1* | 9/2019 | Sethuraman | H04L 63/123 |

FOREIGN PATENT DOCUMENTS

| | | |
|---|---|---|
| WO | 99/59278 A1 | 11/1999 |
| WO | 2003/001702 A1 | 1/2003 |

OTHER PUBLICATIONS

Communication from the Examining Division dated Aug. 12, 2020 for EP Application No. 18198066.
In re: Sauerwein; U.S. Application titled Methods and Apparatuses for Enabling Secure Communication Between Mobile Devices and a Network; U.S. Appl. No. 62/507,455, filed May 17, 2017.
Extended Search Report corresponding to European Application No. 18198066.5, dated Nov. 29, 2018, 8 pages.
Annex to the Summons to Attend Oral Proceedings Pursuant to Rule 115(1) issued in European Application No. 18198066.5 on Feb. 4, 2021, 8 pages.
Summons to Attend Oral Proceedings Pursuant to Rule 115(1) issued in European Application No. 18198066.5 on Feb. 4, 2021, 2 pages.

* cited by examiner

BI-MODAL COMMUNICATION SYSTEM FOR SECURE GOODS TRACKING AND METHODS OF USING THE SAME

TECHNOLOGICAL FIELD

Example embodiments of the present invention relate generally to mobile sensing devices and, more particularly, to methods and apparatuses that generate communication connections between mobile sensing devices and a server.

BACKGROUND

For many IoT deployments, mobile sensing/monitoring platforms are in communication with a backend cloud network that performs analytics on data received from the mobile sensing platform. Typically, the sensing/monitoring platforms communicate to web-services or a cloud network to transfer data obtained at the mobile sensing platform.

Applicant has identified a number of deficiencies and problems associated with conventional material handling systems, and other associated systems and methods. Through applied effort, ingenuity, and innovation, many of these identified problems have been solved by developing solutions that are included in embodiments of the present invention, many examples of which are described in detail herein.

SUMMARY

Traditional methods for establishing channels of communication between cloud service and a target mobile sensing platform are cumbersome, time-consuming, error-prone, and often require manual intervention.

Example embodiments described herein illustrate techniques for goods management and monitoring of goods flowing through a supply chain. In this regard, a method of monitoring and tracking goods based on communication of data from one or more monitoring nodes within or located nearby goods to a server (e.g., an end server, cloud based services, cloud based platforms, or the like) via, one or more gateway nodes or edge devices is described. According to various illustrated embodiments, the one or more monitoring nodes may be for example, mobile sensing platforms including sensors, beacons, RFID tags and other monitoring devices. In this regard, the one or more monitoring nodes may be configured to monitor and collect telemetry data such as, conditions of the goods or the environment in which the goods may be located. For instance, the monitoring nodes may monitor conditions like temperature, pressure, humidity, shock, tilt, speed, direction, acceleration, ambient light, or orientation associated with various commodities in the goods. Further, monitoring nodes may be configured to send and receive data, regarding the goods to the server, such as an end server or an edge device, via the gateway nodes.

In accordance with various illustrated embodiments, the method of monitoring and tracking goods comprises collecting telemetry data from the one or more monitoring nodes. The collected telemetry data may be transmitted as data packets or as at least portions of one or more data packets, over a communication network or a networked environment to the server. In this regard, upon collecting the telemetry data, portions of collected telemetry data may be transmitted via gateway nodes (also referred interchangeably as edge devices hereafter throughout the description), available in the network environment, to the server. For instance, in an example embodiment, the collected telemetry data may form multiple data packets such as, a first data packet or a second data packet which may be transmitted over communication networks like a first communication network or a second communication network depending on network communication quality conditions. Illustratively, the telemetry data may be associated with a condition of goods or a condition of an environment in which the goods are located. Accordingly, the monitoring nodes may be associated to the goods itself or may be installed in an environment in which the goods may be located in.

According to an embodiment, upon collection of the telemetry data, a status information related to transmission of a first data packet, amongst multiple data packets, over the first communication network may be received. Illustratively, the status information may be received at any of one or more gateway nodes or edge devices which operate as intermediate computing nodes in the networked environment for facilitating transmission of data packets between a source monitoring node and a destination server. According to various illustrative embodiments described herein, the status information may be analyzed for ascertaining whether a communication network supporting the transmission of data packets is sufficient to continue transmission of the data packets. In this regard, receiving of the status information pertaining to transmission of telemetry information over a first network, causes analyzing the status information to determine if the transmission of the first data packet over the first communication network satisfies threshold data transmission conditions. In some situations, it may be determined based on the analysis of the status information that the transmission of the first data packet over the first communication network fails to satisfy a pre-determined threshold for transmission of the first data packet. Alternatively, in other situations, it may be determined that the transmission of the first data packet satisfies the pre-determined threshold. In this regard, when the transmission over the first communication network fails to satisfy the threshold conditions, an alternate communication network may be utilized for continuing the transmission of the telemetry data in form of data packets to provide continuous monitoring and tracking of goods flowing through a supply chain.

Accordingly, the illustrated method further includes establishing a communication via a second communication network. Illustratively, for establishing a communication via the second communication network, a network connection quality may be determined. For instance, the network connection quality may be indicative of a network throughput value, or a network reliability or bandwidth value of the second communication network. In this regard, the network connection quality determined may be utilized for continuing transmission of the collected telemetry data over the second communication network.

In accordance with various embodiments described herein, based on determining of the network quality condition and post transmission of the first data packet, a second data packet is altered, such that, rather than transmitting a full second data packet, only a portion of the second data packet is transmitted to the server over the second communication network. In this regard, altering the second data packet may comprise processing the second data packet locally, such as, at an edge device, a gateway or an intermediate node, to generate portions such as, a first portion and a second portion, of the second data packet. In this regard, the data packet is processed locally, such that the generated first portion of the second data packet provides a contextual information indicating actions to be performed based on collected telemetry data. Accordingly, the first portion of the second data packet may be transmitted over the second communication network. Thus, based on the determination of the network connection quality, rather than transmitting the whole second data packet including telemetry data, only a portion of the second data packet, such as generated contextual information, may be transmitted which only includes actions to be performed based on the telemetry data.

According to various example embodiments illustrated herein, the data packets may, along with telemetry data information, include various information, such as a monitoring node identifier (MID) that may uniquely identify one or more monitoring nodes. The data packets may further include an alarm corresponding to the telemetry data monitored by the monitoring node.

According to various example embodiments described herein, upon generation of the first portion of the second data packet, which may include contextual information pertaining to the collected telemetry data, rather than the telemetry data itself, the telemetry data along with remaining data information corresponding to the second data packet may be stored as a second portion of the data packet. In this regard, the second portion of the second data packet may be stored, until satisfactory reconnection is achieved with the first communication network. Accordingly, the second portion of the data packet may be transmitted over the first communication network when the first communication network supports suitable conditions and satisfactory threshold conditions, for enabling transmission of the data packets. Thus, by (a) checking for satisfactory transmission condition, (b) connecting to an alternative second communication network, and accordingly (c) altering the payload for data packets to be transmitted over the alternative communication network, even if transmission conditions related to a first communication network doesn't satisfy threshold conditions, a secure, reliable and continuous transmission of relevant information pertaining to the goods conditions monitored by monitoring nodes, (such as conditions like shock, pressure, temperature, humidity, ambient light, etc. associated with items in the supply chain) to the server can be established.

In an example embodiment, a communication device is provided for establishing communication between the one or more monitoring nodes and the server. The communication device may include a receiver, a transmitter, and a processor in communication with the receiver and the transmitter for performing various steps as set forth herein.

For instance, the communication device may be used for supply chain management and monitoring of goods flowing through a supply chain. In this regard, the communication device may be used for monitoring and tracking goods based on the communication of data from one or more monitoring nodes within or located nearby goods to a server (e.g., an end server, cloud based services, cloud based platforms, or the like) via, one or more gateway nodes or edge devices is described. According to various illustrated embodiments, the one or more monitoring nodes may be for example, mobile sensing platforms including sensors, beacons, RFID tags and other monitoring devices. In this regard, the one or more monitoring nodes may be configured to monitor and collect telemetry data such as, conditions of the goods or the environment in which the goods may be located. For instance, the monitoring nodes may monitor conditions like temperature, pressure, humidity, shock, tilt, speed, direction, acceleration, ambient light, or orientation associated with various commodities in the supply chain. Further, monitoring nodes may be configured to send and receive data, regarding the goods to the server, such as an end server or an edge device, via the gateway nodes.

In accordance with various illustrated embodiments, the communication device for monitoring and tracking goods flowing through a supply chain may be configured to collect telemetry data from the one or more monitoring nodes. The collected telemetry data may be transmitted as data packets or as at least portions of one or more data packets, over a communication network or a networked environment to the server. In this regard, upon collecting the telemetry data, portions of collected telemetry data may be transmitted via gateway nodes (also referred interchangeably as edge devices hereafter throughout the description), available in the network environment, to the server. For instance, in an example embodiment, the collected telemetry data may form multiple data packets such as, a first data packet or a second data packet which may be transmitted over communication networks like a first communication network or a second communication network depending on network communication quality conditions. Illustratively, the telemetry data may be associated with a condition of goods flowing through a supply chain or a condition of an environment in which the goods are located. Accordingly, the monitoring nodes may be associated to the goods itself or may be installed in an environment in which the goods may be located in.

According to an embodiment, upon collection of the telemetry data, the communication device may be configured to receive a status information related to transmission of a first data packet, amongst multiple data packets, over the first communication network. Illustratively, the status information may be received at any of one or more gateway nodes or edge devices which operate as intermediate computing nodes in the networked environment for facilitating transmission of data packets between a source monitoring node and a destination server. According to various illustrative embodiments described herein, the status information may be analyzed for ascertaining whether a communication network supporting the transmission of data packets is sufficient to continue transmission of the data packets. In this regard, after receiving of the status information pertaining to transmission of telemetry information over a first network, the communication device may be configured to cause the analysis of status information to determine if the transmission of the first data packet over the first communication network satisfies threshold data transmission conditions. In some situations, it may be determined based on the analysis of the status information that the transmission of the first data packet over the first communication network fails to satisfy a pre-determined threshold for transmission of the first data packet. Alternatively, in other situations, it may be determined that the transmission of the first data packet satisfies the pre-determined threshold. In this regard, when the transmission over the first communication network fails to satisfy the threshold conditions, the communication device may be configured to use an alternate communication network for continuing the transmission of the telemetry data in form of data packets to provide continuous monitoring and tracking of goods flowing through a supply chain.

Accordingly, the communication device may further be configured to establish a communication via a second communication network. Illustratively, for establishing a communication via the second communication network, a network connection quality may be determined. For instance, the network connection quality may be indicative of a network throughput value, or a network reliability or bandwidth value of the second communication network. In this regard, the network connection quality determined may be utilized for continuing transmission of the collected telemetry data over the second communication network.

In accordance with various embodiments described herein, based on determining of the network quality condition and post transmission of the first data packet, the communication device may be configured to alter a second data packet, such that, rather than transmit a full second data packet, only a portion of the second data packet is transmitted to the server over the second communication network. In this regard, altering the second data packet may comprise processing the second data packet locally, such as, at an edge device, a gateway or an intermediate node, to generate portions such as, a first portion and a second portion, of the second data packet. In this regard, the data packet is processed locally, such that the generated first portion of the second data packet provides a contextual information indicating actions to be performed based on collected telemetry data. Accordingly, the first portion of the second data packet may be transmitted over the second communication network. Thus, based on the determination of the network connection quality, rather than transmitting the whole second data packet including telemetry data, only a portion of the second data packet, such as generated contextual information, may be transmitted which only includes actions to be performed based on the telemetry data.

According to various example embodiments illustrated herein, the data packets may, along with telemetry data information, include various information, such as a monitoring node identifier (MID) that may uniquely identify one or more monitoring nodes. The data packets may further include an alarm corresponding to the telemetry data monitored by the monitoring node.

According to various example embodiments described herein, upon generation of the first portion of the second data packet, which may include contextual information pertaining to the collected telemetry data, rather than the telemetry data itself, the communication device may be configured to store the telemetry data along with remaining data information corresponding to the second data packet as a second portion of the data packet. In this regard, the second portion of the second data packet may be stored, until satisfactory reconnection is achieved with the first communication network. Accordingly, the second portion of the data packet may be transmitted over the first communication network when the first communication network supports suitable conditions and satisfactory threshold conditions, for enabling transmission of the data packets. Thus, by (a) checking for satisfactory transmission condition, (b) connecting to an alternative second communication network, and accordingly (c) altering the payload for data packets to be transmitted over the alternative communication network, even if transmission conditions related to a first communication network doesn't satisfy threshold conditions, a secure, reliable and continuous transmission of relevant information pertaining to supply chain conditions monitored by monitoring nodes, (such as conditions like shock, pressure, temperature, humidity, ambient light, etc. associated with items in the supply chain) to the server can be established.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings, which are not necessarily drawn to scale.

DETAILED DESCRIPTION

Figure 1:
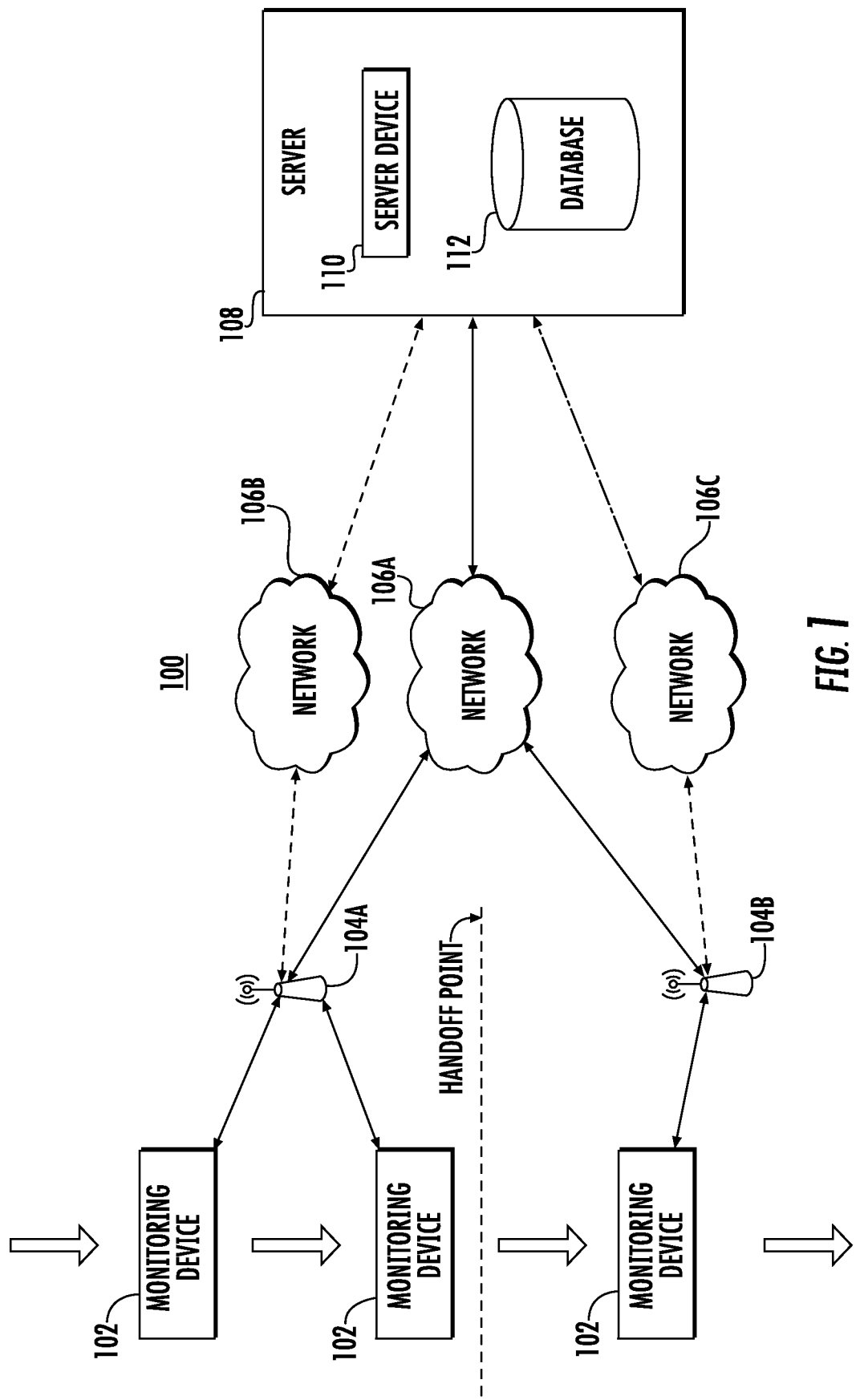
FIG. 1 illustrates a network environment comprising a monitoring node and a plurality of edge devices or gateway nodes in communication over multiple communication networks with a server.

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention.

The word "exemplary," when used herein, is intended to mean "serving as an example, instance, or illustration." Any implementation described herein as "exemplary" is not necessarily preferred or advantageous over other implementations.

The term "monitoring node" is used herein to refer to a wired or wireless device configured to transmit and/or receive information in some form. In this regard, a monitoring node may comprise an active or passive sensor that can gather information regarding its environment (e.g., by measuring temperature, pressure, humidity, shock, tilt, speed, direction, acceleration, ambient light, orientation, or the like), a transmitter (e.g., facilitating transmission of information to a server), a receiver (e.g., facilitating receipt of information from a server), or some combination thereof. In some embodiments, a monitoring node may further include more than one of the aforementioned components. In some embodiments, the monitoring node may further include a processor and a memory as discussed further below.

The term "sensor(s)" refers generally to any sensing device or device that detects events or changes in its environment and sends the information to other electronics. For instance, the sensor may include a scanner, an indicia reading unit, a RFID reading unit, an image capturing and processing unit, for collecting such forms of telemetry data. The sensor may be any one of a pressure sensor, a humidity sensor, a motion sensor, light sensor, and/or a temperature sensor for measuring various conditions of the goods or the environment in which the goods are located such as, temperature, pressure, humidity, shock, tilt, speed, direction, acceleration, ambient light, or orientation. As used herein "telemetry data" refers generally to any data obtained by an associated sensor in a remote location (e.g., when in transit or located away from an initial starting point).

The term "monitoring node identifier" (i.e., MID) refers to a private token unique to a given monitoring node. Although a monitoring node may include a serial number, the serial numbers may often be publicly displayed on a housing of the monitoring node and in any event is often required for purposes other than secure communication (e.g., inventory management, part replacement, compatibility inquiries, or the like). In contrast, the MID comprises a private token stored by the monitoring node (and it may be stored by the monitoring node in encrypted form in some embodiments). The MID may be exchanged between the monitoring node and a network establishment service prior to deployment of the monitoring node, and may thereafter be used by the monitoring node to decipher communications encrypted using the MID. In some embodiments, the MID may also comprise a capability matrix defining capabilities of the corresponding monitoring node.

The term "monitoring platform" is used herein to refer to an association of one or more monitoring nodes that capture information regarding an environment. While there may only be one monitoring node in some monitoring platforms, other monitoring platforms may comprise many distinct monitoring nodes and thus may capture a wide variety of environmental information.

The term "gateway node" refers to an access point capable of communicating directly with one or more monitoring nodes and also capable of communicating (either directly or alternatively indirectly via a network such as the Internet) with a server. The term "preferred gateway node" refers to a gateway node that has been logically paired by a network establishment service with a particular monitoring node.

The term "server" refers to a server system that manages deployment of one or more monitoring nodes throughout a physical environment.

Overview

In many IoT applications, mobile sensing/monitoring platforms communicate data via edge devices, such as gateways to a backend cloud network for performing analytics on data received from such mobile sensing platforms. Single mode communications systems for such environments are subject to outages, limited availability, and partial/limited connectivity and these limitations can be exacerbated when IoT solutions operate in areas where connectivity optimization has not been implemented. Further, most of such supply chain applications require continuous monitoring of data, such as telemetry data. In this regard, transmission of data over a preferred network link having ideal transmission conditions is usually challenging, as network transmission conditions as well as volume and type of data to be transmitted in such application areas such as freight and logistics, consistently change over time. In a dynamic manner, network or communication channels with superior transmission conditions may be selected for transmitting the data. However, selecting a best mode of communication channel dynamically while still maintaining the integrity and reliability of data under transmission has associated challenges. In most of such situations, establishing communication of the cloud service with a target mobile sensing platform is cumbersome, time-consuming, and error-prone, and often requires manual intervention for handling and defining network parameters and preferred gateways.

Example embodiments described herein provide methods, apparatuses, and systems for monitoring and tracking goods flowing through a supply chain in an environment comprising one or more monitoring nodes that may communicate data to a server such as, a back-end server or a cloud based platform over multiple networks. For instance, data related to commodities may be tracked and communicated either continuously or periodically by the monitoring nodes 102 to the server 108. In this regard, the communication or transmission of data occurs via multiple gateway nodes, or edge devices, to the back-end servers. According to various embodiments illustrated herein, multiple monitoring nodes transmits: (a) telemetry data monitored by the monitoring nodes, via edge devices or gateway nodes to a server over a communication network or alternatively, (b) an altered data packet via the edge devices to the server over a communication network based on the network connection quality and conditions. In this regard, in accordance with various embodiments illustrated herein, based on an analysis of status information associated with the transmission of data packets and a network connection quality associated with a communication network, the data packets under transmission may be altered intermediately during transmission, before being sent to the server. Altering of the data packets involves dividing the data packets into smaller portions by processing the data packets, locally and intermediately at the edge devices before sending to the server. The data packets are altered such that, in adverse network quality conditions, rather than sending all collected telemetry data over the communication network, only a portion of data packet which may include contextual information associated to the telemetry data is transmitted to the server.

The mobile sensing or monitoring platforms may include multiple sensor nodes/devices, other monitoring devices or tracking equipment, such as beacons, sensors, barcodes, RFID tags, and/or like, deployed in an environment and these monitoring nodes may be utilized for a variety of purposes within the environment. For instance, in supply chain management and logistics, there may be many commodities, consumer goods, that are being shipped or in transit, on which coded information like barcodes, QR codes, or RFID tags, sensors, beacons, are affixed for tracking details and movement of the commodities throughout from a source to a destination. In such scenarios, these monitoring nodes may be affixed at multiple places within a logistic environment for monitoring and alerting the commodity movement from one place to another place during a logistic transaction. Also, in some applications, such monitoring nodes including multiple sensors, are deployed in a working area for sensing data pertaining to performance and management of such commodities.

Any data pertaining to the commodities, such as details of the commodity, its corresponding transactions, movement of the commodity, or any other information associated with the commodity to be tracked, may be communicated from such monitoring nodes to back end servers, like a cloud based platform via multiple edge devices or gateway nodes. In this regard, the cloud based service or the back-end servers are utilized for accessing the data and performing analytics on the data to provide customized services over the IoT network. For example, a logistic or supply chain service provider may use a cloud based service that accesses data pertaining to commodities in transit from one location to another. As described previously, shipments or freight vehicles may carry different types of commodities where details of each of such commodity is encoded in RFID tags or barcodes affixed to the commodities or where multiple sensors or beacons are affixed on one or more freight vehicles carrying such commodities. In this regard, such sensors or beacons may in a continuous or periodic manner transmit data, for example, pressure or temperature sensed in the freight environment or a shipping vehicle, or identifier information, such as product encoded information, to the back-end servers or cloud based service, over a communication channel or a communication network. In many such example scenarios, generally, these sensing/monitoring platforms communicate to web services or cloud network via multiple mobile/network gateways also referred to as edge devices, preferred for communication.

The goods to be tracked may be tracked and monitored in a warehouse, at cross dock facilities, in Customs Holding/Clearance areas, across states, countries, oceans, etc. For instance, the present system may track and monitor a shipment of flowers from Ecuador to New York, pharmaceuticals from Zurich to Helsinki, brake parts from Mexico to Detroit, online purchases from a distribution center to the buyer's front door, etc. The following paragraphs with respect to illustrated FIGS. 1-6, provide more details on various embodiments of the present disclosure related to the transmission of the data packets and monitoring and tracking of goods flowing through a supply chain by the way of data transmission.

FIG. 1 illustrates an example embodiment of a network environment 100, where a monitoring node 102, may communicate data, via multiple gateway nodes or edge devices 104A, 104B . . . 104N, over one or more communication networks 106A, 106B, and 106C with a server 108, such as a cloud based platform or a back-end server as the monitoring node 102 moves is in transit (the movement of the monitoring node 102 is shown by the arrows). In accordance with an example implementation of the illustrated embodiment, the server 108 may comprise a server device 110 that may be communicatively coupled to a database 112. Referring to the illustrated embodiment, in a freight or logistic application environment, the data to be communicated may be telemetry data or data pertaining to the freight environment, which may be collected and transmitted from the monitoring node 102 to the server 108, over multiple communication networks such as, a first communication network 106A, a second communication network 106B, or a third communication network 106C and so on. In this regard, the monitoring node 102 may comprise sensors or from remote sensors collect telemetry data to be transmitted to the server 108. The data transmission from the monitoring node 102 to the server 110 may happen via multiple edge devices or gateway nodes 104A, 104B . . . 104N.

In accordance with an example embodiment, a method of monitoring and tracking goods flowing through a supply chain including data transmission over the network environment 100 is described hereinafter. According to an example implementation of the illustrated embodiment, the method may include, receiving telemetry data for transmission in the form of one or more data packets. In this regard, any of an edge device or a gateway node 104A, 104B may receive the telemetry data from one or more monitoring nodes (e.g., monitoring node 102). As described earlier, the telemetry data associated with goods indicative of conditions, or the data may be pertaining to the commodities under transit in a freight, such as details of the commodity, its corresponding transactions, movement of the commodity or any other information associated with the commodity to be tracked. The telemetry data may be received at the edge device from the monitoring nodes 102 for transmission to the server 108. Referring to FIG. 1, it may be understood that the monitoring node 102 may communicate to the server 108 for transmitting data in the form of data packets over a first communication network 106A.

In accordance with the illustrated embodiment, the method may also include receiving status information pertaining to the transmission of the data packets over the one or more communication networks 106A, 106B, and/or 106C. For instance, the edge device or a gateway node 104A may receive from the server 108, status information related to transmission of a first data packet over a first communication network 106A. In this regard, the status information may be indicative of various events or details associated with transmission of data packets, for instance, the status information may be an acknowledgement indicative of successful transmission of data packet from the monitoring node 102 to the server 106. Alternatively, the status information may itself be a data packet in which its payload includes information about performance or quality of a communication network for transmitting data packet. Illustratively, the status information may comprise any of, network parameters or details like, a time duration consumed for transmitting the first data packet to the server 106, a performance of the first communication network, an amount of the first data packet that was received by the server over the first communication network, or a condition of the first data packet that was received by the server over the first communication network.

Upon receipt of the status information, the status information may be analyzed for determining if the transmission of the data packets over the communication networks 106A, 106B, or 106C meets or fails to meet one or more predetermined thresholds for transmission of the data over the communication networks. In this regard, based on the analysis, the transmission of the data packets may continue with the same communication network, e.g., the first communication network 104A, if the data transmission satisfy the criteria or may be switch to another communication network, like 104B if the data transmission fails to satisfy the predetermined thresholds.

Illustratively, in accordance with various embodiments illustrated herein, on initial deployment, one or more monitoring nodes 102 may connect to the server 108 by a default first communication network 106A, such as a cellular connection. Accordingly, the monitoring node 102 may transmit data, such as the telemetry data monitored by the monitoring node 102 via the edge device 104A to the server 106, over the first communication network 106A. However, if upon analysis of the status information it is determined that the data transmission over the default communication network fails to satisfy a pre-determined criterion or a threshold, then any of the edge device 104A or the monitoring node 102 may search for a new or alternate communication network, such as a second communication network 104B, that it can access and use for transmitting the same or subsequent data packets. Accordingly, it may so happen that over a period, the edge devices or gateway nodes 104A, 104B . . . 104N, may ascertain a quality or performance of communication networks, for transmission of data and may accordingly switch and establish connection to other alternate networks such as, 106B, 106C and so on, depending on the threshold requirement.

In accordance with the illustrated embodiment, based on the determination of a failure associated with the data transmission via the first communication network 106A, a connection between the monitoring node 102 to the server 108 may be established via the edge device or gateway node 104A, via a second communication network 106B. In this regard, the second communication network 104B may be selected based on determining of a network connection quality associated with the second communication network 106B. For instance, the network connection quality may be indicative of network quality related parameters such as, a network throughput, a network reliability, or a network bandwidth availability associated with the second communication network 106B. In such determination, it may so happen, that a network connection quality, such as a bandwidth availability or a network throughput of the second communication network 106B, may not fully support transmission of the data packets containing the collected telemetry data. For instance, in an example freight application where the collected telemetry data regarding the freight environment may include images of commodities located in a freight, and the network bandwidth of the second communication network 106B may not permit transmitting such high volume or size of data packets. In this regard, according to various embodiments described herein, upon transmission of the first data packet over the first communication network, the data packets remaining to be transmitted, such as, second data packet onwards, may be transmitted over the second communication network 106B based on alternation and modifications on the data packets as disclosed herein.

According to various example embodiments illustrated herein, altering the second data packet involves processing the second data packet locally at the edge devices 104A, 104B, and generating portions of data packets which only includes actionable information based on the data to be transmitted for the subsequent data packets. For instance, the edge device 104A, may alter the second data packet by processing the data packet to derive and associate contextual information with the telemetry data to generate portions of data packets, such as in a first portion of the data packet. For instance, the telemetry data may be analyzed and associated with certain contextual information (such as alerts or flags) that may be stored in a database to determine the contextual information to transmit to the cloud based service or back-end server. For instance, minimum and maximum parameters may be associated with the telemetry data such that should the telemetry data reach or exceed those parameters, then the telemetry data would be associated with certain contextual information that can then be transmitted instead of the full telemetry data. In another embodiment, for example, where the telemetry data includes multiple images in the data packets, the edge device or a gateway node 104A, upon determining the network connection quality of the second communication network 106B, may alter the second data packet to generate a portion of the second data packet which only includes contextual information derived after processing the images and may not include the images themselves.

While altering the data packets, a payload content of the second data packet may be altered by dividing the second data packet into a first portion and a second portion, such that the first portion of the data packet contains a monitoring node identifier (MID) and additional contextual information, such as an alarm or a flag to be raised, based on processing of the telemetry data. The second portion of the data packet may contain the actual telemetry data, for example captured images, collected by the monitoring node 102. Further, while the second communication network may not support a high bandwidth or network throughput, by processing the data packets locally and intermediately at the edge device 104, the first portion of the second data packet may still be transmitted to the server 106 via the second communication network 106B. In this manner, for situations where the network connection quality determined for a communication network is not ideal or does not permit transmission of full size telemetry data packets, a smaller size data packets or portions of data packets only containing actionable or resulting information or key information, corresponding to the data packets may still be transmitted over the alternate or second communication network. For application areas, such as freight and logistics, while the freight is in transit and communication networks in a region or remote area doesn't support reliable transmission of complete telemetry data pertaining to freight conditions or the freight environment, by the way of implementation of the present subject matter, the freight can be continuously tracked or monitored. In this regard, in such remote areas, the data packets may be altered and contextual information from such data packets may be transmitted over alternate communication networks.

Having described example embodiments at a high level, the design of the various devices performing various example operations is provided below.

System Architecture

Methods, apparatuses, and computer program products of the present invention may be embodied by any of a variety of devices. Example embodiments may include a plurality of devices operating in a globally-networked system. In doing so, example embodiments may comprise a server in connection with any of a variety of monitoring nodes via one or more edge devices or gateway nodes.

Figure 2:
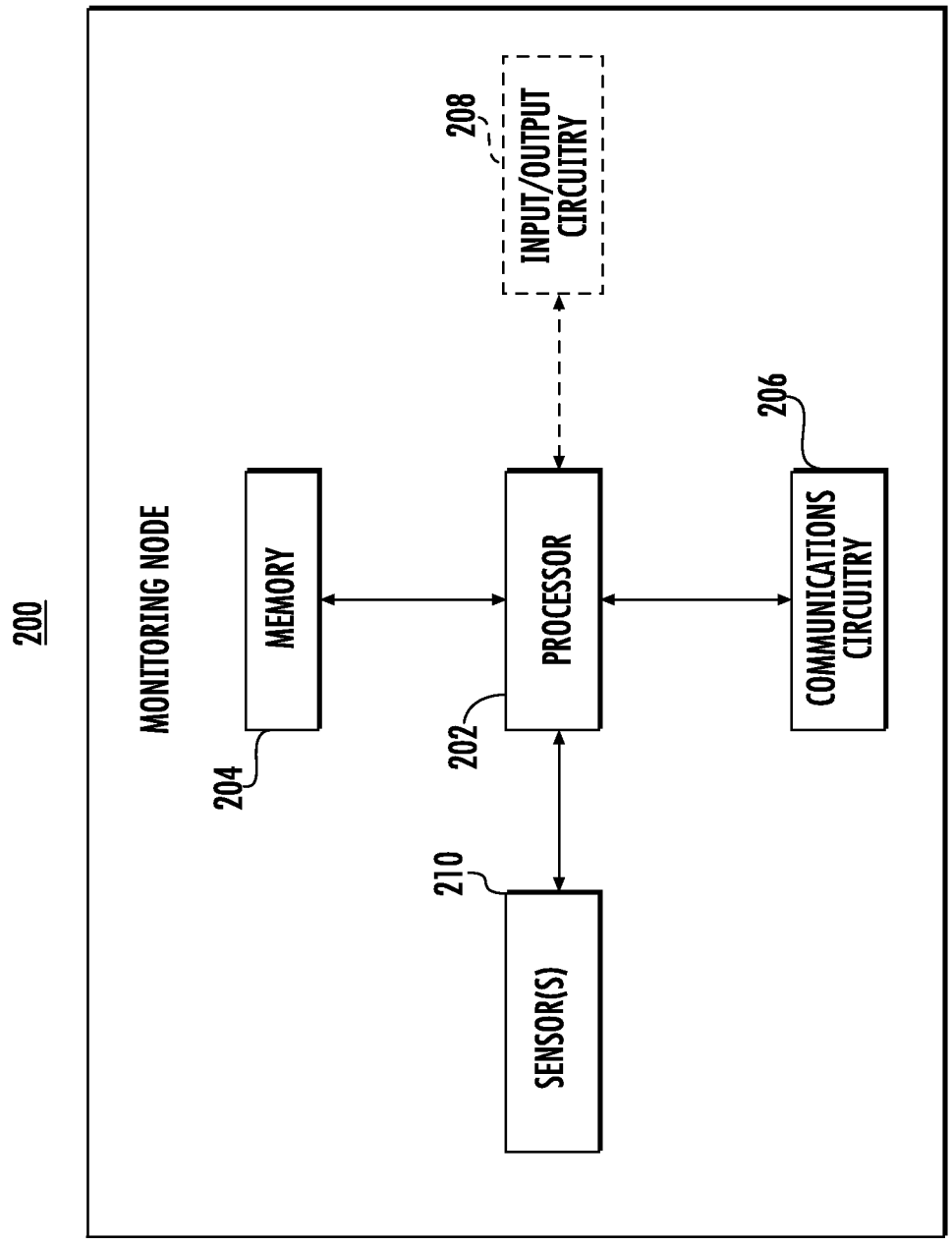
FIG. 2 illustrates a schematic block diagram of example circuitry embodying a monitoring node that may perform operations in accordance with some example embodiments described herein.

Turning to FIG. 2, an example apparatus 200 is illustrated that may represent a basic set of components of a device embodying an example monitoring node 102. The apparatus 200 may include a processor 202, a memory 204, and communications circuitry 206. In some embodiments, the device may further include input/output circuitry 208 for interacting with a user, and sensor(s) 210 for collecting data. Although these components 202-210 are described with some functional descriptors, it should be understood that the particular implementations necessarily include the use of particular hardware. In this regard, the apparatus 200 may be configured to execute the operations described below in connection with FIG. 5. It should also be understood that certain of these components 202-210 may include similar or common hardware. For example, the sensor(s) 210 may leverage use of the processor 202, memory 204, communications circuitry 206, and/or input/output circuitry 208 to perform their associated functions, and duplicate hardware is not required for the distinct components of the apparatus 200 (although embodiments using duplicated hardware are also contemplated herein). The use of the term "circuitry" as used herein with respect to components of the apparatus therefore includes particular hardware configured to perform the functions associated with the particular circuitry described herein. Of course, while the term "circuitry" should be understood broadly to include hardware, in some embodiments, circuitry may also include software for configuring the hardware components of the apparatus 200.

In some embodiments, the processor 202 (and/or co-processor or any other processing circuitry assisting or otherwise associated with the processor) may be in communication with the memory 204 via a bus for passing information among components of the apparatus. The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination of hardware with software, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments contemplated herein.

The communications circuitry 206 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 206 may include, for example, a network interface for enabling communications with a wired or wireless communication network. For example, the communications circuitry 206 may include one or more network interface cards, antennae, buses, switches, routers, modems, and supporting hardware and/or software, or any other device suitable for enabling communications via a network. Additionally or alternatively, the communication interface 206 may include the circuitry for interacting with the antenna(s) to cause transmission of signals via the antenna(s) or to handle receipt of signals received via the antenna(s). These signals may be transmitted by the apparatus 200 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX), or other proximity-based communications protocols.

The communication circuitry 206, which includes hardware components designed to manage pairing of monitoring nodes with communication networks to facilitate creation of channels of communication between the monitoring nodes and the server 108. Communication circuitry 206 may utilize processor 202, memory 204, or other hardware component included in the apparatus 200 to perform these functions.

It should be appreciated that, in some embodiments, communication circuitry 206 may include a separate processor, specially configured field programmable gate array (FPGA), or application specific interface circuit (ASIC) to perform the above-described functions. Communication circuitry 206 is therefore implemented using hardware components of the apparatus configured by either hardware or software for implementing these planned functions.

In some embodiments, the apparatus 200 may include input/output circuitry 208 that may, in turn, be in communication with processor 202 to provide output to a user and, in some embodiments, to receive an indication of user input. The input/output circuitry 208 may comprise a user interface and may include a display that may include a web user interface, a mobile application, a client device, or the like. In some embodiments, the input/output circuitry 208 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The apparatus 200 may in some embodiments also include one or more sensor(s) 210. In this regard, sensor(s) 210 may comprise active or passive sensors that can gather information regarding the environment surrounding the apparatus 200 (e.g., by measuring temperature, pressure, humidity, shock, tilt, speed, direction, acceleration, ambient light, orientation, or the like).

Figure 3:
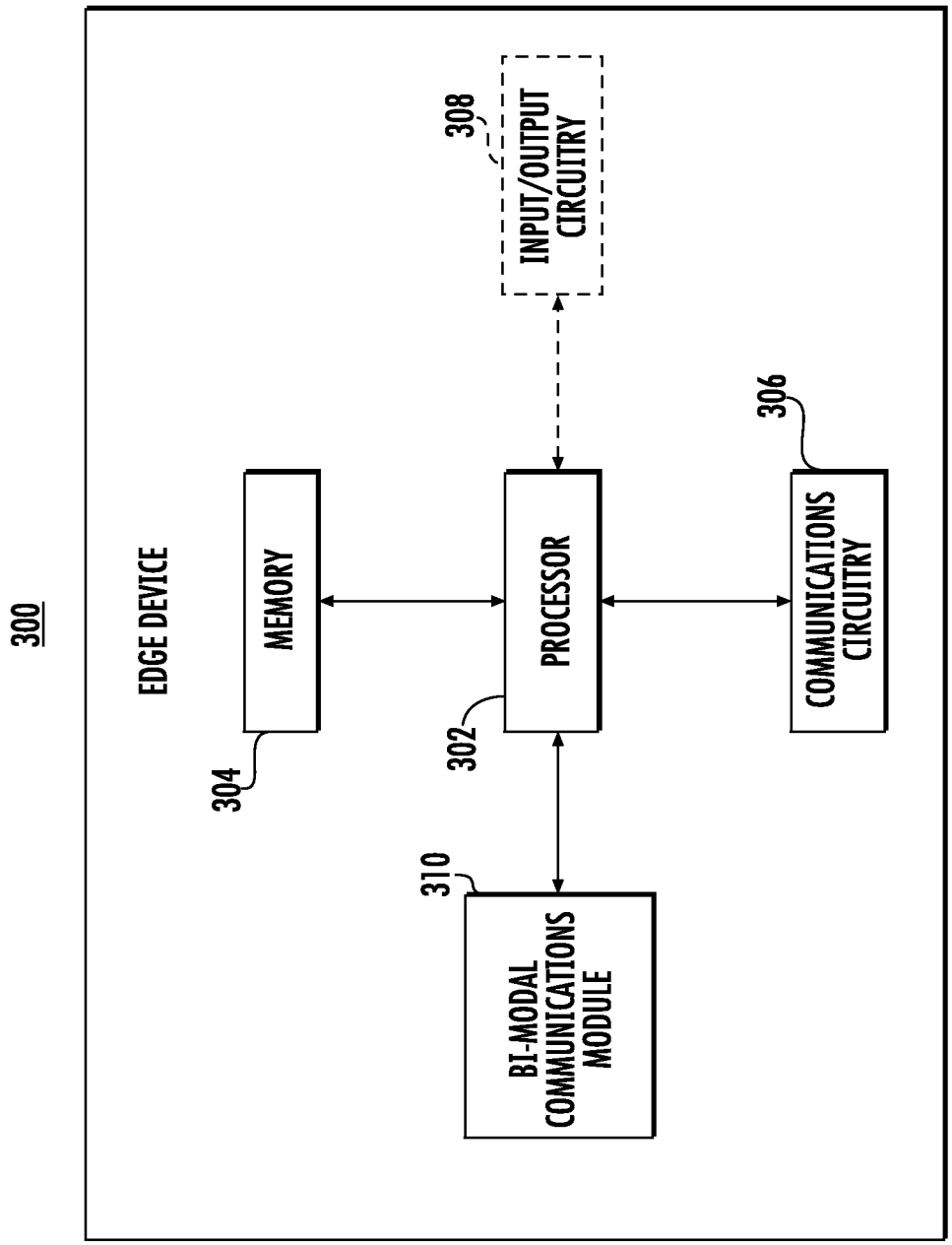
FIG. 3 illustrates a schematic block diagram of example circuitry embodying an edge device that may perform operations in accordance with some example embodiments described herein.

Turning next to FIG. 3, an example apparatus 300 is illustrated that may represent a basic set of components of a gateway node or edge device 104A, 104B, as shown in FIG. 1. The apparatus 300 may include a processor 302, a memory 304, communications circuitry 306, and, in some embodiments, input/output circuitry 308. In some embodiments, the device may further include input/output circuitry 308 for interacting with a user, and bi-modal communications module 310 for handling communications between various communication networks. For instance, bi-modal communications module 310 may handle analyzing status information or causing the status information to be analyzed; establishing a connection to a communication network or causing a connection to be established; altering one or more data packets or causing one or more data packets to be altered; receiving/transmitting or causing the receipt of or transmission of telemetry data, status information, data packets, etc. The apparatus 300 may be configured to execute the operations described below in connection with FIG. 6. Although these components 302-310 are described with some functional descriptors, it should be understood that the particular implementations necessarily include the use of particular hardware. It should also be understood that certain of these components 302-310 may include similar or common hardware. For example, the bi-modal communications module 310 may leverage use of the processor 302, memory 304, communications circuitry 306, and/or input/output circuitry 308 to perform their associated functions, and duplicate hardware is not required for the distinct components of the apparatus 300 (although embodiments using duplicated hardware are also contemplated herein). The use of the term "circuitry" as used herein with respect to components of the apparatus therefore includes particular hardware configured to perform the functions associated with the particular circuitry described herein. Of course, while the term "circuitry" should be understood broadly to include hardware, in some embodiments, circuitry may also include software for configuring the hardware components of the apparatus 300.

Because the functionality of processor 302, a memory 304, communications circuitry 306, and input/output circuitry 308 are similar to the functionality described in connection with the similar features of FIG. 2, further description of such functionality is omitted here for brevity only.

However, the bi-modal communications module 310 provides additional functionality not described previously in connection with FIG. 2. Specifically, bi-modal communications module 310 may utilize any hardware component included in the apparatus 300 to perform its various functions. For instance, bi-modal communications module 310 may utilize communications circuitry 306 to receive status information, telemetry data, data packets, etc., thus facilitating generation of information for transmission to cloud based services, back-end servers, and/or monitoring nodes regarding the received information. Bi-modal communications module 310 may utilize communications circuitry 306 to transmit any of the above information transmission to cloud based services, back-end servers, and/or monitoring nodes.

Bi-modal communications module 310 may utilize processing circuitry, such as the processor 302, to facilitate performance of its various operations, and may utilize memory 304 to store computer instructions that, when executed, cause the bi-modal communications module 310 to perform those operations.

As noted above, the bi-modal communications module 310 may be configured to execute any of the operations described below in connection with FIG. 6. For instance, the bi-modal communications module 310 may receive telemetry data for transmission in one or more data packets over a first communication network, wherein the telemetry data is indicative of at least one of a condition of the goods or a condition of an environment in which the goods are located; receive status information relating to a transmission of a first data packet of the one or more data packets to a server over the first communication network; cause the status information relating to the transmission of the first data packet to be analyzed for the determination of whether the transmission of the first data packet failed to satisfy a predetermined threshold; establish a connection to a second communication network for transmission of the second data packet by determining a network connection quality indicative of at least one of a network throughput, a network reliability, or a network bandwidth of the second communication network; alter the second data packet, based on determining the network connection quality, wherein altering comprises processing the second data packet locally and generating a first portion related to the second data packet, the first portion comprising contextual information indicative of actions to be performed based on the collected telemetry data; transmit the first portion related to the second data packet over the second communication network instead of the full second data packet; or combinations thereof. Any of these operations may be performed alone on the bi-modal communications module 310 or in conjunction with other components of the gateway node or edge device, such as shown in FIG. 3. In one embodiment, the bi-modal communications module 310 may determine that the transmission of one or more data packets is unsatisfactory by determining that at least one of a length of time for transmission of the first data packet to the server over the first communication network, an amount of the first data packet that was received by the server over the first communication network, or a condition of the first data packet that was received by the server over the first communication network is insufficient for transmitting at least the portion of the same or subsequent data packets to the cloud based service or back-end server. The bi-modal communications module 310 may include a predetermined threshold level of each of these parameters to compare status information to in determining whether the transmission was satisfactory or will be satisfactory.

The bi-modal communications module 310 may also search or cause the device to search for an alternate communication network by analyzing alternate communication networks for the ability to transmit at least a portion of one or more data packets. Such analyzing may be performed by comparing the network throughput, network reliability, network bandwidth, etc. of the respective communication network to predefined limits. The bi-modal communications module 310 may measure these parameters directly or cause these parameters to be measured.

As noted above, the bi-modal communications module 310 may handle altering one or more data packets in view of the communication network. For instance, the bi-modal communications module 310 may process one or more data packets locally and generate one or more portions related to the respective data packet. Processing and generating one or more portions of the data packets may include associating any collected telemetry data, MID, or other data received by the gateway node or edge device 300 with one or more contextual information to be transmitted over a communication network. The bi-modal communications module 310 can determine the appropriate contextual information to be transmitted and transmit or cause the information to be transmitted instead of the full telemetry data when appropriate. The bi-modal communications module 310 may also monitor available communication networks to determine when and to what network to connect with for transmitting subsequent data packets (full or altered).

Figure 4:
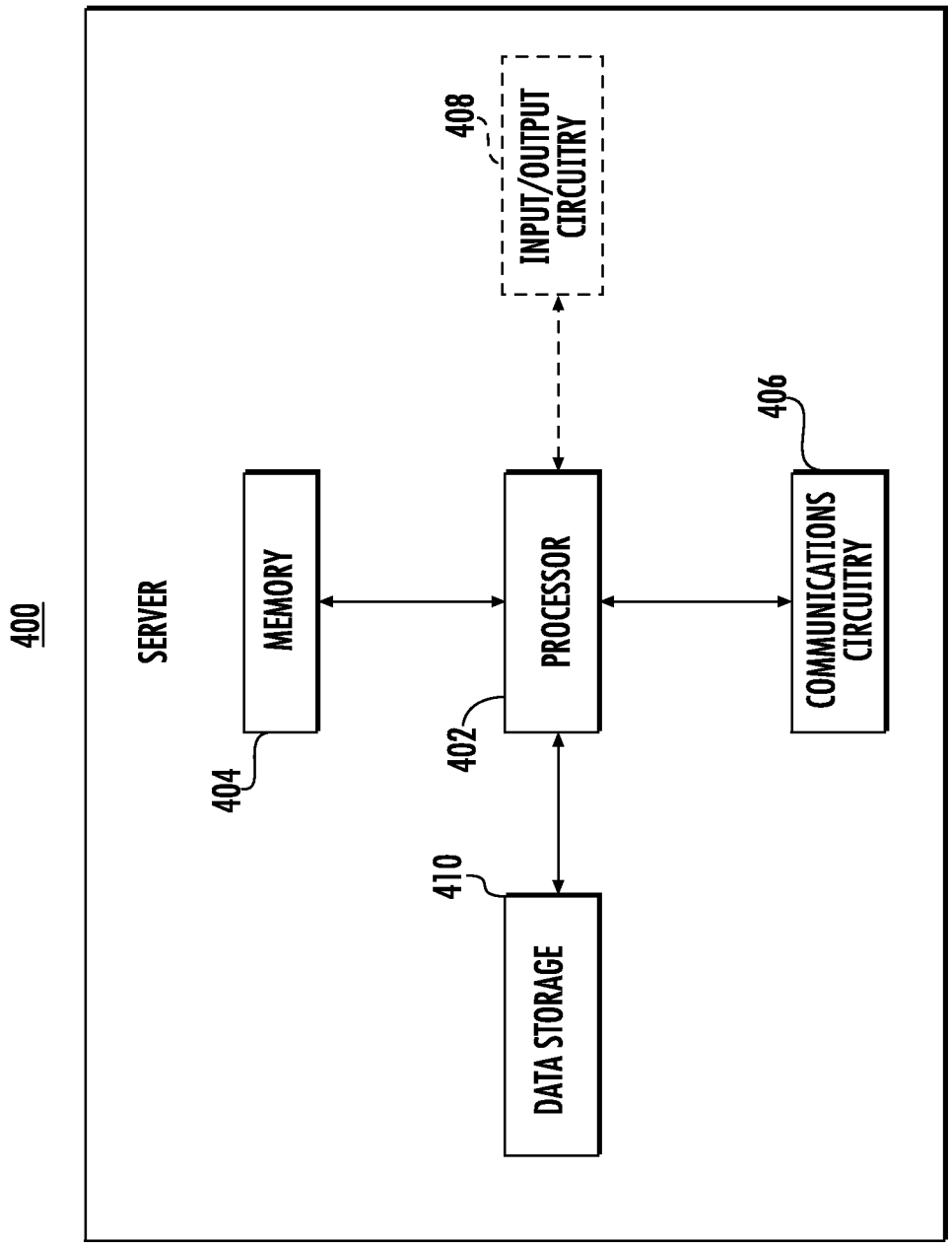
FIG. 4 illustrates a schematic block diagram of example circuitry embodying a server that may perform operations in accordance with some example embodiments described herein.

Turning next to FIG. 4, an example apparatus 400 is illustrated that may represent a basic set of components of a server 108, as shown in FIG. 1. The apparatus 400 may include a processor 402, a memory 404, communications circuitry 406, and, in some embodiments, input/output circuitry 408. In some embodiments, the device may further include input/output circuitry 408 for interacting with a user, and data storage 410 for pairing storing data received from the monitoring node(s). The apparatus 400 may be configured to execute the operations described below in connection with FIG. 6. Although these components 402-410 are described with some functional descriptors, it should be understood that the particular implementations necessarily include the use of particular hardware. It should also be understood that certain of these components 402-410 may include similar or common hardware. For example, the data storage 410 may leverage use of the processor 402, memory 404, communications circuitry 406, and/or input/output circuitry 408 to perform their associated functions, and duplicate hardware is not required for the distinct components of the apparatus 400 (although embodiments using duplicated hardware are also contemplated herein). The use of the term "circuitry" as used herein with respect to components of the apparatus therefore includes particular hardware configured to perform the functions associated with the particular circuitry described herein. Of course, while the term "circuitry" should be understood broadly to include hardware, in some embodiments, circuitry may also include software for configuring the hardware components of the apparatus 400.

Because the functionality of processor 402, a memory 404, communications circuitry 406, and input/output circuitry 408 are similar to the functionality described in connection with the similar features of FIG. 2, further description of such functionality is omitted here for brevity only.

However, the data storage 410 provides additional functionality not described previously in connection with FIG. 2. Specifically, data storage 410 may utilize any hardware component included in the apparatus 400 to perform its various functions. For instance, data storage 410 may utilize communications circuitry 406 to receive the MID of a particular monitoring node, thus facilitating generation of information for transmission to that monitoring node regarding the communication network.

Data storage 410 may utilize processing circuitry, such as the processor 402, to facilitate performance of its various operations, and may utilize memory 404 to store computer instructions that, when executed, cause the data storage 410 to perform those operations.

As described above and as will be appreciated based on this disclosure, example embodiments may be implemented by a plurality of devices, such as fixed devices, mobile devices, backend network devices, and/or the like. Accordingly, embodiments may comprise various means including entirely of hardware or combination of hardware with software. Furthermore, embodiments may take the form of a computer program product stored on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

It should be appreciated, with respect to certain devices embodied by apparatuses 200, 300, and 400 as described in FIGS. 2, 3, and 4, respectively, computer program instructions and/or other type of code may be loaded onto a computer, processor or other programmable apparatus's circuitry to produce a machine, such that the computer, processor other programmable circuitry that execute the code on the machine create the means for implementing various functions described herein.

Having described specific components of example devices (e.g., apparatuses 200, 300, and 400) that may carry out some functionality of the system described herein, example embodiments of the present invention are described below in connection with a series of flowcharts.

Operations Performed by a Monitoring Node

Figure 5:
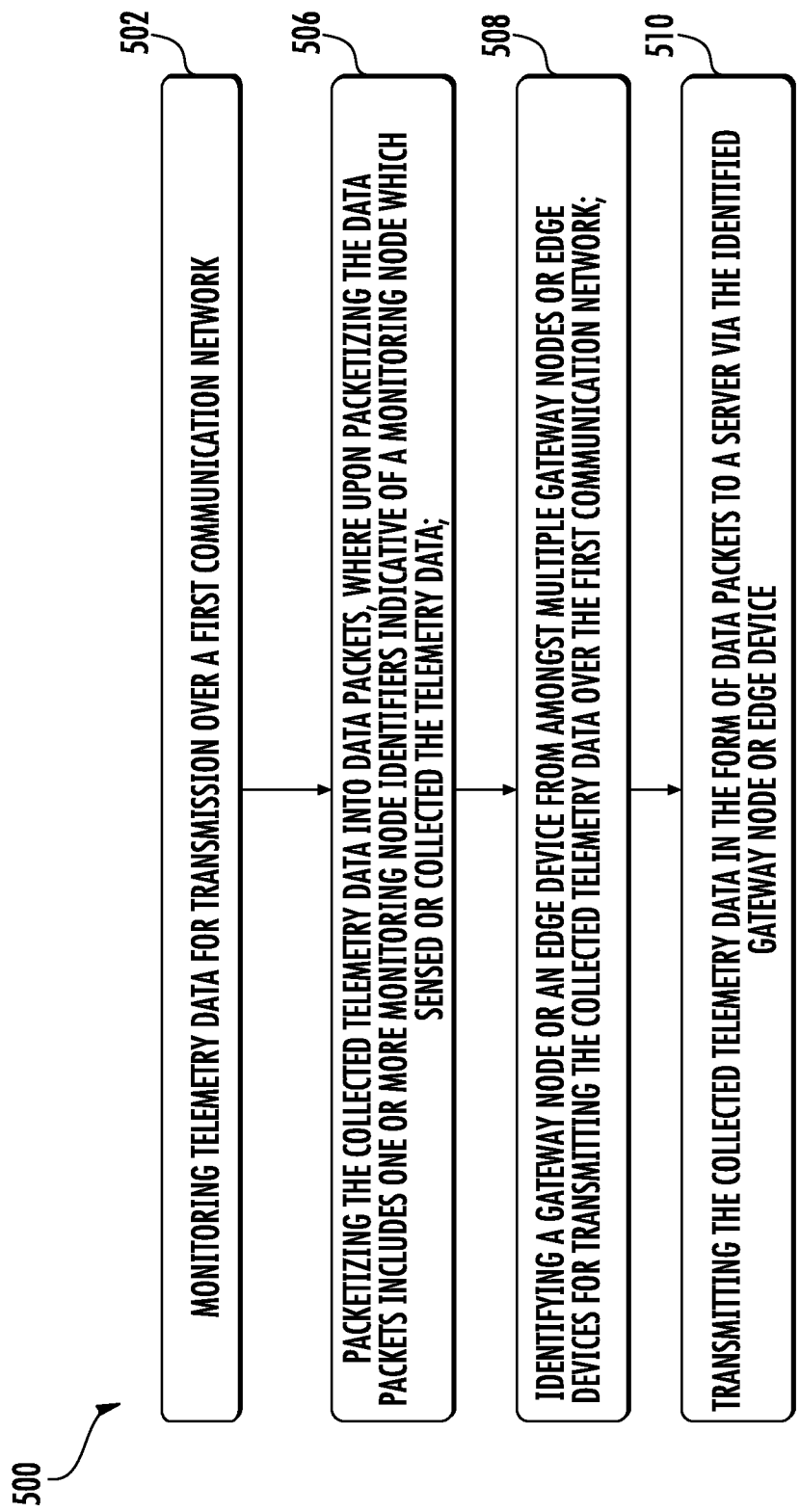
FIG. 5 illustrates a flowchart describing example operations performed by a monitoring node, in accordance with some example embodiments described herein.

Turning to FIG. 5 a flowchart is illustrated that contain operations performed by an apparatus 200 that is also illustrated in the network environment 100, as monitoring node 102 in FIG. 1. In this regard, the flow chart illustrates operations performed by the apparatus 200 also referred herein as monitoring node(s) 102 for monitoring and tracking goods flowing through a supply chain. The operations illustrated in FIG. 5 may, for example, be performed by, with the assistance of, and/or under the control of an apparatus 200 embodying a monitoring node 102, and more particularly through the use of one or more of processor 202, memory 204, communications circuitry 206, input/output circuitry 208, and sensor(s) 210.

Turning first to operation 502, the apparatus 200 includes one or more sensor(s) 210 for collecting telemetry data. In this regard, the apparatus 200 may comprise a single sensor unit or a sensor sub-system 210 including multiple sensors, for monitoring and collecting telemetry data. The one or more sensors may collect a variety of information such as pressure, humidity, motion, temperature, ambient light, etc. In some embodiments, the sensors may include an image capturing unit such as an image sensor to create images of the environment in which the monitoring node is located. The monitoring nodes 102 may be installed within or in a vicinity of the goods for monitoring various types of data, referred hereinafter as telemetry data that is associated with (a) commodities in the supply chain, (b) conditions in an environment, (c) conditions in environment in which the goods are located in, like conditions, or combinations thereof. Illustratively, in some embodiments, the monitoring nodes 102 may be configured with capability to access or collect telemetry data in form of RFID identifiers such as RFID tags or encoded indicia such as barcodes, QR codes affixed to commodities in the transit. The one or more sensors may include an indicia reading unit, a RFID reading unit, and/or an image capturing and processing unit, for collecting such forms of telemetry data. The apparatus 200 may include the sensors 210 as one or more of a pressure sensor, a humidity sensor, a motion sensor, light sensor, and/or a temperature sensor for measuring various conditions of the goods or the environment in which the goods are located in such as, temperature, pressure, humidity, shock, tilt, speed, direction, acceleration, ambient light, or orientation. In accordance with various embodiments illustrated herein throughout the description, the telemetry data may form one or more data packets such as, a first data packet, a second data packet and so on, which may be transmitted by the apparatus 200 to the server 106.

Turning to operation 506, the telemetry data collected, received, or accessed at the apparatus 200 may be packetized into data packets by the processor 202 of the apparatus 200. In this regard, the processor 202 may store the collected telemetry data in form of data packets, in the memory 204. While packetizing, the processor 202 may associate a monitoring node identifier (MID) associated with the monitoring node 200 and include it in a header of the data packets. Further, the processor 202 may include the telemetry data containing information such as sensing values, goods conditions, etc., in a payload of multiple data packets such as, a first data packet, a second data packet and so on, which may be transmitted by the apparatus 200 to the server 108 illustrated in FIG. 1.

Illustratively, in application areas like supply chain logistics, the MID included in the data packets, may be a physical MAC address associated to sensors in an environment, or any or a barcode, QR code, RFID tag identifier associated to commodities or items in transit, or any other private token that uniquely identifies the monitoring node 102.

Illustratively, as described before, the telemetry data may also include one or more conditions of the goods or the environment in which the goods are located, such as, temperature, pressure, humidity, shock, tilt, speed, direction, acceleration, ambient light, or orientation. Accordingly, in some example embodiments, the payload of the data packets may also comprise one or more alarms corresponding to minimum or maximum limits of the telemetry data, such as temperature or pressure, measured by the monitoring node regarding the goods or an environment in which the goods are located. It may be understood that, in application areas, like supply chain tracking, one or more alarms may be generated based determining that information monitored or sensed by the monitoring node 102 associated with the goods is above a predefined threshold, like prescribed climatic or environmental conditions for a consumer item.

Turning to operation 508, the processor 202 of the apparatus 200, may identify a gateway node or an edge device 104A, from amongst multiple gateway nodes 104A, 104B . . . 104N for transmitting the data packets corresponding to the telemetry data monitored by the monitoring nodes. In this regard, in a network environment 100, there may be different gateway nodes or edge devices 104A, 104B . . . 104N which may support data transmission and act as a network switching device. In such situations, the monitoring nodes 102 while movement from a network to another network performs a handoff between the gateway nodes or edge devices 104A, 104B . . . 104N that are associated with the monitoring nodes 102, referred herein as the apparatus 200, and that are available to the monitoring nodes 102. For instance, in supply chain logistics applications, goods may move from a source location to a destination and cross several geographical regions and networks available for communication or data transmission. In such situations, usually for different networks, different gateway nodes or edge devices, amongst the available gateway nodes may be preferable for establishing connection with the monitoring nodes 102 of the freight in transit. Accordingly, the processor 202 of the monitoring node may identify the gateway node 104A, suitable for data transmission. For example, while the goods are in transit through a remote area where no external gateway nodes or network access points are available, the monitoring nodes 102 associated with the goods may connect with a local gateway node or edge device 104A, such as a network access point, Near field communications (NFC) enabled, or Bluetooth supported, that is installed on the freight carrier itself, which may not support a high throughput and high speed data transmission. However, in some situations, e.g., when the goods are not in transit or is located in an urban region, the monitoring nodes 102, may identify an external network access point or edge device 104B, with availability of network supporting high speed, high throughput Wi-fi access. Accordingly, a handoff may also take place between such gateway nodes 104A and 104B, while the goods move between networks.

Turning to operation 510, the communication circuitry 206 of the monitoring node 200 may transmit the data packets via the identified gateway nodes or edge devices 104A, 104B . . . 104N. In this regard, the data packets containing the telemetry data may be transmitted to a back end server or a cloud storage, such as the server 108 for performing data analytics on the telemetry data to initiate actions like sending notifications, alerts etc. based on the processing of the received telemetry data at the server 108.

Operations Performed by an Edge Device or a Gateway Node

Figure 6:
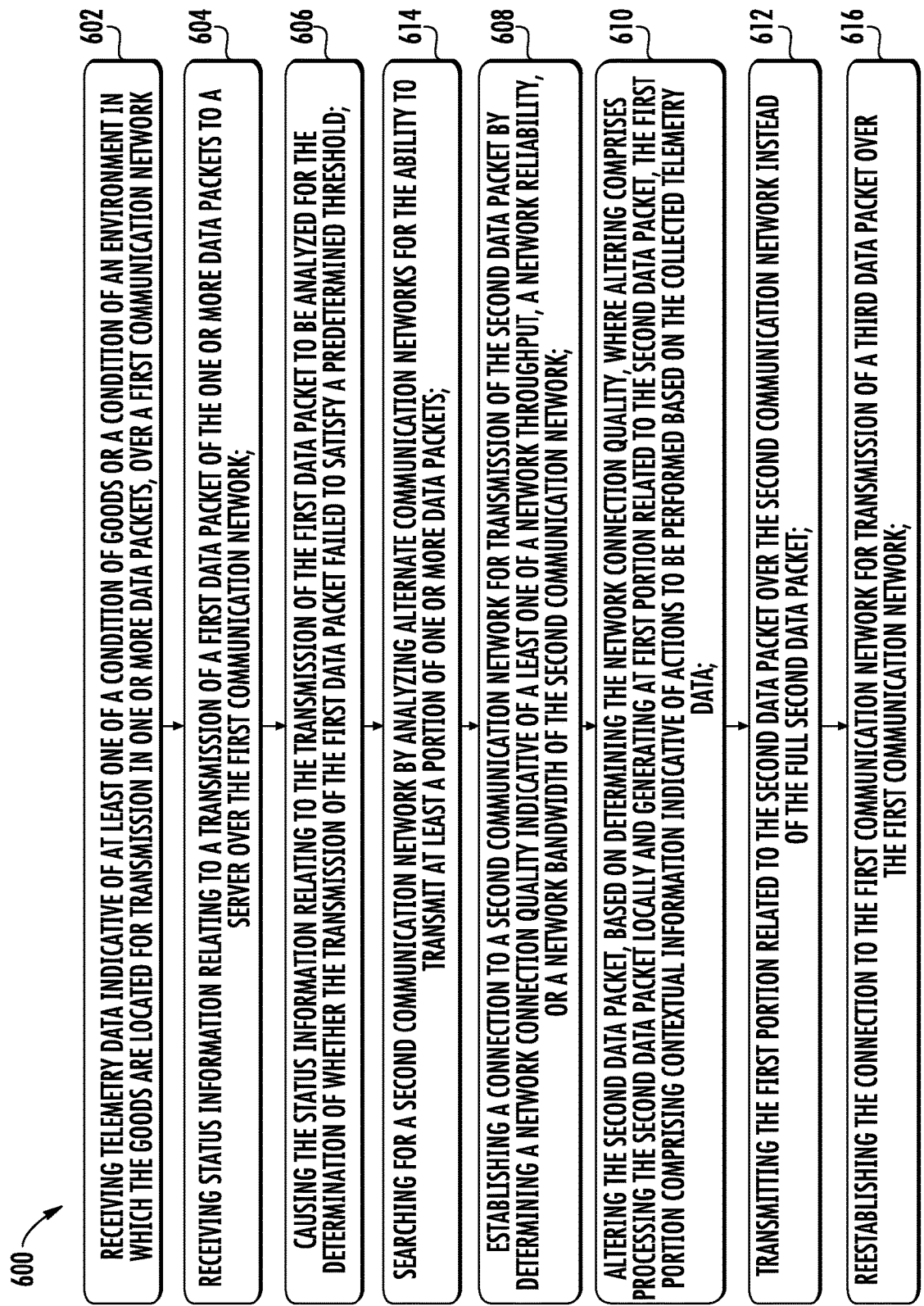
FIG. 6 illustrates a flowchart describing example operations performed by an edge device or a gateway node, in accordance with some example embodiments described herein.

Turning to FIG. 6 a flowchart is illustrated that contain operations performed by an edge device 300 also referred herein as the edge device or a gateway node 104A or 104B, in the network environment 100 as illustrated in FIG. 1. In this regard, the flow chart illustrates operations performed by the edge device 300 including the edge device 104A for monitoring and tracking goods flowing through a supply chain in a supply chain logistics environment. Illustratively, the edge devices 104A, 104B or gateway nodes, may be any of monitoring nodes 102 itself or a network router, a network switch, proxy server, a network bridge or any other gateway device that facilitates communication amongst one or more computing nodes, such as a monitoring node, and various other computing resources, such as a back-end server and/or like within a network. The operations illustrated in FIG. 6 may, for example, be performed by, with the assistance of, and/or under the control of an apparatus 200 embodying a monitoring node 102, and more particularly through the use of one or more of processor 302, memory 304, communications circuitry 306, and input/output circuitry 308, and bi-modal communication module 310.

In an example implementation, the edge device 300 may be utilized in a supply chain environment, where a vehicle or an automotive carries multiple commodities like consumer goods or items, from one location to another location, such as from a manufacturing unit to a distribution center, or from a distribution center to multiple retailer stores. In such applications, the edge device 300, such as gateway nodes or edge devices 104A, 104B, as illustrated in FIG. 1 may be operable for transmitting telemetry data collected from various monitoring nodes associated with the goods to a back-end server. In this regard, the monitoring nodes 102 and, in some embodiments, the gateway nodes 104A, 104B, may be installed either on the vehicle or automotive itself or may also be located outside the goods, or within a region surrounding the goods. For instance, in some example embodiments, edge device 300, also referred herein as the edge device 104A, may be associated with the goods, such as at a top surface or a front side of the vehicle carrying the goods. Alternatively, in some situations, the edge device 300 may any edge device or gateway nodes 104A, 104B, which are situated external to the goods, such as within a region, like a pit-stop station, from where the goods are currently in transit.

As described earlier, in a supply chain network environment, there may be several geographical or cellular regions for which there may be corresponding gateway nodes or edge devices which are preferred for communication or transmission of data. In such situations, a hand-off may take place from a first edge device 104A to a second edge device 104B, as soon as the goods transit between different regions. The edge device 300 or edge devices may receive telemetry data from various monitoring nodes 102, as illustrated in FIG. 1, such that the monitoring nodes 102 are associated with goods or the environment in which the goods are located and may communicate the received telemetry data to the server 108.

As illustrated in FIG. 3, the edge device 300 may receive telemetry data in form of one or more data packets. In this regard, as illustrated at operation 602, the apparatus 300 may receive the telemetry data from multiple monitoring nodes 102 over a communication network. Illustratively, the receiving of the telemetry data at the edge device 300 may occur in any manner such as, periodically, or continuously, or on demand basis, through various monitoring nodes 102. In some example embodiments, the edge device 300 may also receive telemetry data from one or more other gateway nodes or edge devices 104A, 104B, in the network environment. For example, in a freight transit scenario, the freight may be moving from a source such as, from a west end of a country to a destination such as, an east end of a country. In such cases, the freight may move across various geographical and corresponding cellular regions across which the network connection between the freight devices, like monitoring nodes 102 may be continuously established via handoffs happening amongst various gateway nodes or edge devices preferred for a geographical or cellular region and the monitoring nodes 102 of the freight. Accordingly, the edge device 300 may receive telemetry data from various sources, like other gateway nodes, in form of data packets, such as a first data packet followed by a second data packet and so on.

Illustratively, the edge device 300 may comprise of a receiver for receiving the telemetry data and a transmitter for transmitting the received telemetry data to a back-end server via one or more communication networks. Accordingly, upon receiving the data packets, the edge device 104A, in a default or normal network conditions, the communications circuitry 306 may transmit a first data packet of the received telemetry data to the server 108 over a default or the first communication network 106A.

Turning to operation 604, the communications circuitry 306 may receive status information relating to the transmission of a first data packet, from amongst multiple data packets received at the apparatus 300, to the server 108. In this regard, the status information may be indicative of various events or details, for instance, in an example, the status information may be an acknowledgement indicative of successful transmission of data packet from the monitoring node 102 to the server 106. Alternatively, the status information may comprise network and/or quality parameters associated to data transmission, a time duration consumed for transmitting the first data packet to the server 106, a performance of the first communication network, an amount of the first data packet that was received by the server over the first communication network, a condition of the first data packet that was received by the server over the first communication network, or combinations thereof.

Turning of operation 606, the processor 302 of the edge device 300, upon receiving the status information may analyze the status information relating to transmission of the first data packet. In this regard, in some example embodiments, analysis of the status information may be triggered automatically based on receiving the status information at the bi-modal communication module 310. The processor 302 and/or bi-modal communication module 310 may analyze the status information to determine whether the transmission of the first data packet over the first communication network 106A failed to satisfy a pre-determined threshold. The following paragraphs, further provides details on the analysis of the status information and the determination of transmission of data packets to satisfy pre-determined threshold.

As described earlier, in accordance with various illustrated embodiments, the data packets corresponding to the telemetry data may be received at the edge device 300 for transmission via any of communication networks 106A, 106B, and 106C. In this regard, it may so happen that initially the data packets may be transmitted via a default or first communication network 104A which the apparatus 200 may utilize as a default communication network, after deployment in the network environment. Thereafter, over a period, based on analysis of network conditions and performance of data transmission, the edge device 300 may connect with alternative communication networks for continuing the data transmission.

Referring to operation 606, upon receiving and analyzing the status information, after a period, the edge device 300 may determine if a default communication network, like 104A, utilized by the edge device 300 is still relevant and applicable for continuing transmission of the data packets over the same network based on current network condition or a network connection quality. In this regard, the edge device 300 may analyze the status information pertaining to the transmission of the one or data packets that the edge device 300 receives from the server 108. The analysis of the status information may include parsing of a data packet received as a response to the transmitted data packets to the server 108. In this regard, the parsing of the data packet pertaining to the status information may enable the edge device 300 to access various information included in a payload or header of the data packet. For instance, based on the analysis of the status information, the edge device 300 may determine if a length or duration of time required for transmitting the data packets from the edge device 300 to the server 108 is unsatisfactory for transmitting the data packets. Alternatively, based on the analysis of the status information, the edge device 300 may determine if an amount of the data packet that was received by the server 108 over the first communication network 106A is not optimal for transmitting the data packets further over the first communication network. Illustratively, the edge device 300 may also determine a condition of the data packet received at the server 108 via the first communication network 106B, to be unsatisfactory for transmitting a second data packet to the server 108 via the first communication network 106A.

Turning to operation 608, based on the analyzing of the status information and determination of threshold condition, the edge device 300, may establish a connection to a second communication network for continuing transmission of data packets. In this regard, it may so happen, that upon analyzing the status information as described at operation 606, the edge device 300 may so determine that a current communication network, like, the first communication network 106A, is not suitable for continuing the transmission of the data packets. In such situations, the edge device 300 may disable the connection to the server 108, via the first communication network 104A. Accordingly, before disabling, the edge device 300 may search for an alternative communication network 614, such as a second communication network 106B, and establishes connection to the server 108, via the second communication network 106B, for transmitting data from the second data packet onwards.

For establishing the connection to the second communication network 106B, the edge device 300 via operations of the processor 302 and/or the bi-modal communication module 310 may also determine a network connection quality associated with the second communication network 106B. Illustratively, according to various example embodiments, the network connection quality may be indicative of at least one of a network throughput, a network bandwidth, and/or a network reliability for the network. Based on the determination of the network connection quality, the edge device 300 may determine if it is ideal to send remaining data packets in the same manner, like, sending complete telemetry data in a payload of the data packets. In this regard, if based on the determination of the network connection quality associated to the second communication network 104B, it appears that a reliable data transmission of the remaining data packets is not possible, a processing of the data packets locally at the edge device 300 may be performed. Details of local processing of the data packets at the edge device 300 are more described in following paragraphs.

Turning to operation 610, the edge device 300, upon determining the network connection quality of a second communication network 106B, to be not optimal or ideal for transmitting full sized data packets, may alter remaining data packets into portions of data packets. In this regard, the edge device 300 may alter the second data packet or multiple data packets followed by the second data packets onwards, by processing the data packets locally and generating portions from the data packets. For instance, the edge device 300 may process the data packet and based on processing divide the data packets into multiple portions, such as a first portion and a second portion respectively. In some embodiments, the edge device 300 may process the data packet including the telemetry data to identify and further associate contextual information from the data packets and store the contextual information in a first portion of the data packet. The contextual information may be such that the first portion or a payload of the first portion of the second data packet is of a smaller size as compared to the size of a full data packet. The data packets may be altered, in a way that the network connection quality of the second communication network 106B, supports reliable transmission of such smaller size portions of the data packets.

Illustratively, the contextual information of the telemetry data packets may comprise various details, such as a flag value, an alarm, an action or a trigger to be initiated based on the telemetry data stored in the second data packet etc. Following illustration with respect to a supply chain management application provides more details on the processing of the data packets locally and the contextual information.

In some supply chain management applications, various camera units, such as in monitoring nodes 102, are installed inside a vehicle for capturing images or video stream, of various commodities and its respective locations where these commodities are placed within the vehicle. In such situations, it is often required to identify a left-over space inside the vehicle or a placement capacity of vehicle, for allocating more commodities to be placed in the vehicle from a next source on a transit path of the vehicle. In such situations, usually, the camera units installed in the vehicle or around the goods captures multiple images and uploads or streams it to a back-end server, which usually consumes sizeable network bandwidth and requires a high network throughput for a communication network to reliably transmit all data. Based on the receiving of the multiple images or the video stream, the back-end server processes the data packets and identifies the left-over spaces or the placement capacity of the vehicle. Accordingly, the back-end server may send an instruction or notification to the next source location for preparing and setting up several items of be placed inside the vehicle, upon arrival of the vehicle in transit. However, in such situations, if a communication network doesn't have a bandwidth to support uploading or streaming a high volume of telemetry data packets containing images or frames of video stream, by way of implementation of the embodiments illustrated herein, such data packets may be altered by the edge device 300 locally and divided into portions, such that, rather than streaming all images to the server, only a portion of the data packet containing only a flag or indication of placement capacity of the vehicle or a count of items inside the vehicle may be transmitted to the back-end server, such as server 108, for taking a suitable action. Illustratively in alternate embodiments wherein the telemetry data includes coded information such as indicia like barcodes, QR codes, or encoded RFID tag information, the data packets may be processed locally and decoded at the edge device 300 itself for transmitting a portion including an action, a flag value or a notification to be raised based on the decoding of the data packets. Thus, in such applications, the edge device 300 may alter the data packets into portions, such that, a first portion of the second data packet contains contextual or actionable information, like flag values, alarms, etc. and the remaining portions of the second data packet includes actual full size telemetry data. In this regard, the edge device 300 may divide the second data packet into two portions, for example, a first portion and a second portion. Illustratively, in an example embodiment, the two portions may correspond to a monitoring node identifier (MID) having a private token unique to the monitoring node and to the telemetry data collected by the monitoring node 102. Accordingly, the edge device 300 may store the second portion or remaining portions of the data packets into a memory 304 of the edge device 300.

Turning to operation 612, the edge device 300 may transmit the first portion of the second data packet, generated upon the local processing of the data packets at the edge device 300. In this regard, the edge device 300 may temporarily store the remaining portions of the second data packet and only transmits the first portion of data packet generated upon the local processing.

Illustratively, in some example supply chain application environment, the telemetry data may correspond to sensing values sensed by various sensors, like monitoring nodes 102, installed in the environment in which the goods are located. For instance, when the commodities to be transported are consumer goods like consumable goods or eatables, it is often required to install multiple sensors, such as a temperature sensor, a pressure sensor etc. for monitoring temperature and pressure values required for preserving the consumable items while the goods are in transit. In such applications, its often required that based on receiving of the sensing values at the server and determining if the sensing values are not ideal, the server may initiate an alarm or raise a flag, such as a notification on a mobile device, indicating that environmental conditions are deteriorating or non-ideal for preserving food items. Accordingly, at an upcoming pit-stop on a freight route, a driver or a support staff at a distribution store may take corresponding actions to establish the correct temperature and pressure values in the vehicle environment. In such applications, if during the transit, a handoff of the communication network from a first communication network 106A to a second communication network 106B occurs, as illustrated at operations 606 and 608, and the network connection quality associated with the second communication network 106B is not ideal, the edge device 104A or 104B handling the transmission of the data packets may not transmit the full second data packet to the server 108. Rather, in such situations, the edge device 300 may process the second data packet locally and identify a flag or notification to be raised based on the sensing values accessed from a payload of the second data packet. Accordingly, the edge device 300 may only transmit the flag or notification in a first portion of the second data packet to the server 108. It may be understood that the size of the portion of the second data packet containing only a flag or notification would be much smaller than the size of complete second data packet. Also, a smaller size portion of data packet may easily be transmitted over the second communication network 106B, even if the network connection quality is determined not to be ideal.

In an example embodiment, the edge device 300, upon altering and dividing the second data packet in the first portion and the second portion may store the second portion until a reconnection happens with the first communication network 616, if such reconnection occurs. Further, upon re-establishing a connection to the first communication network 106A, a third data packet including the telemetry data may be transmitted to the server 108 over the first communication network 106A.

It may be noted that, adjusting the data packets may include dividing of the data packets separately into two portions may provide several advantages. Illustratively, in some situations, the first communication network 104A can be a cellular network that may although occasionally go down, however, provides enough bandwidth for uploading and transmitting data, whereas, on the other hand, the second communication network, like a near field communication network, although being readily available for communication, may not provide sufficient bandwidth for transmitting a reasonable size of the telemetry data. In such situations, by way of implementation of the illustrated embodiments, when the first communication network goes down, the payload content of the data packets may be adjusted and the data packets may be divided such that, information via the MID, signifying a collection and monitoring of telemetry data and indicative of availability of monitoring nodes 102, and/or a contextual information indicative of one or more alarms corresponding to maximum or minimum limits of the telemetry data, may still be transmitted to the server 108 via the second communication network, whereas actual telemetry data collected by the apparatus may be transmitted to the server when reconnecting back to the first communication network 104A. Thus, by transmitting the first portion of the data packet pertaining to the MIDs, throughout the transit of the goods, the commodities may be tracked and monitored constantly without being much effected by deviations in the network connection quality over a transit of the goods.

Operations Performed by a Server

Figure 7:
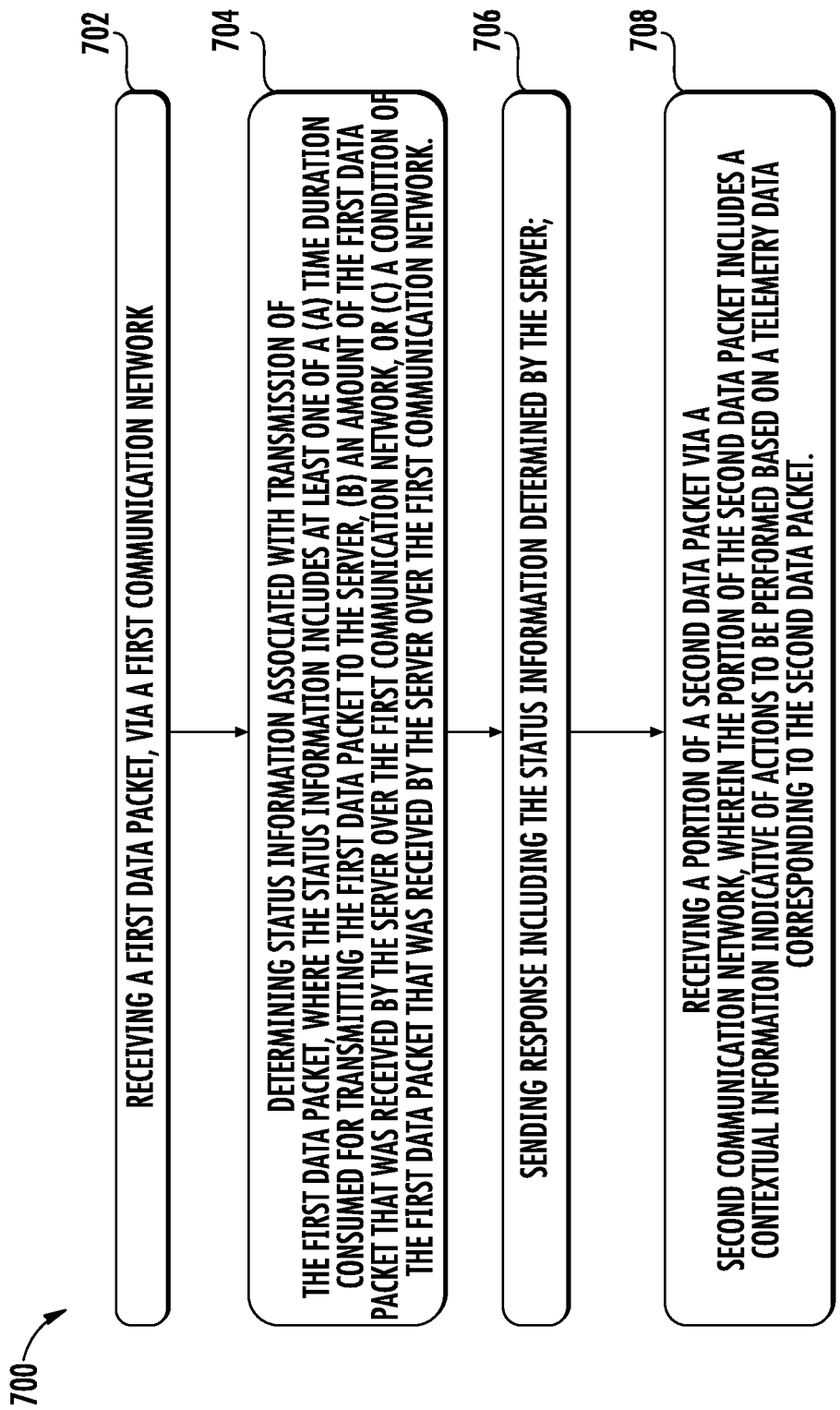
FIG. 7 illustrates a flowchart describing example operations performed by a server, in accordance with some example embodiments described herein.

Turning to FIG. 7, a flowchart is illustrated that contain operations performed by the server 108 to facilitate establishment of a secure communication channel between a server and a monitoring node. The operations illustrated in FIG. 7 may, for example, be performed by, with the assistance of, and/or under the control of an apparatus 400 embodying a server 108, and more particularly through the use of one or more of processor 402, memory 404, communications circuitry 406, an input output circuitry 408, and data storage 410.

Turning first to operation 702, the communications circuitry 406 of the server 400 may receive a first data packet over a first communication network 106A. In this regard, as illustrated in description of FIGS. 5 and 6, the server 400 may receive the first data packet including telemetry data collected by one or more monitoring nodes 102. The processor 402 of the server may store the received data packet in the memory 404 and/or the data storage 410 of the server. The processor 402 may also parse the data packet to identify a monitoring node identifier (MID) from a header of the data packet. Illustratively, the MID may be indicative of an identifier, such as a MAC address, or an IP address, or a barcode, an encoded information from a RFID tag or barcode, that uniquely identifies the monitoring node 102 from which the telemetry data is being received. Illustratively, in some embodiments, the MID may also identify goods to which the monitoring node 102 is associated. In accordance with the illustrated embodiment, the processor 402 may also process the received data packet for determining various information, such as a status of a network, or a flag or action item to initiate based on the telemetry data.

Turning to operation 704, the processor 402 of the server 400 may determine a status information associated with the transmission of the first data packet over the first communication network 106A. In this regard, the processor 402 may determine at least one of a time duration consumed for transmitting the first data packet to the server 400, an amount of the first data packet that was received by the server 400 over the first communication network, a condition of the first data packet that was received by the server over the first communication network 106B, or combinations thereof. Alternatively, the processor 402 may determine any other parameter or function associated with a quality of transmission of the data packet received at the server 108.

Turning to operation 706, the communication circuitry 406 of the server 400 may send a response including the status information determined by the processor 402 of the server 400. In this regard, according to an example embodiment, the communication circuitry 406 may send the response with the status information as an acknowledgment to the receipt of the first data packet.

Turning to operation 708, the communication circuitry 406 of the server 400 may receive a portion of a second data packet, such that the portion of the second data packet includes a contextual information indicative of actions to be performed based on a telemetry data corresponding to the second data packet. In this regard, the communication circuitry 406 of the server 400 may receive the portion of the second data packet based on the status information sent by the server 400 as described in reference to FIG. 6.

FIGS. 5 through 7 illustrate example flowcharts describing operations performed in accordance with example embodiments of the present invention. It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions residing on a non-transitory computer-readable storage memory. In this regard, the computer program instructions which embody the procedures described above may be stored by a memory of an apparatus employing an embodiment of the present invention and executed by a processor of the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart blocks. When executed, the instructions stored in the computer-readable storage memory produce an article of manufacture configured to implement the various functions specified in flowchart blocks. Moreover, execution of a computer other processing circuitry to perform various functions converts the computer or other processing circuitry into a particular machine configured to perform an example embodiment of the present invention. Accordingly, the operations set forth in the flowcharts define one or more algorithms for configuring a computer or processor, to perform an example embodiment. In some cases, a general purpose computer may be provided with an instance of the processor which performs algorithms described in one or more flowcharts to transform the general purpose computer into a particular machine configured to perform an example embodiment.

Accordingly, the described flowchart blocks support combinations of means for performing the specified functions and combinations of operations for performing the specified functions. It will also be understood that one or more flowchart blocks, and combinations of flowchart blocks, can be implemented by special purpose hardware-based computer systems which perform the specified functions, or combinations of special purpose hardware that execute computer instructions.

In some example embodiments, certain ones of the operations herein may be modified or further amplified as described below. Moreover, in some embodiments additional optional operations may also be included. It should be appreciated that each of the modifications, optional additions or amplifications described herein may be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The hardware used to implement the various illustrative logics, logical blocks, modules, and circuits described in connection with the aspects disclosed herein may include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively or in addition, some steps or methods may be performed by circuitry that is specific to a given function.

In one or more example embodiments, the functions described herein may be implemented by special-purpose hardware or a combination of hardware programmed by firmware or other software. In implementations relying on firmware or other software, the functions may be performed as a result of execution of one or more instructions stored on one or more non-transitory computer-readable media and/or one or more non-transitory processor-readable media. These instructions may be embodied by one or more processor-executable software modules that reside on the one or more non-transitory computer-readable or processor-readable storage media. Non-transitory computer-readable or processor-readable storage media may in this regard comprise any storage media that may be accessed by a computer or a processor. By way of example but not limitation, such non-transitory computer-readable or processor-readable media may include RAM, ROM, EEPROM, FLASH memory, disk storage, magnetic storage devices, or the like. Disk storage, as used herein, includes compact disc (CD), laser disc, optical disc, digital versatile disc (DVD), floppy disk, and Blu-ray Disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media may be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the supply management system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

The invention claimed is:

1. A method for monitoring and tracking goods flowing through a supply chain, the goods associated with at least one monitoring node configured to send and receive data regarding the goods, the method comprising:

receiving telemetry data for a transmission in a plurality of data packets to a server, wherein the telemetry data is indicative of at least one of a condition of the goods or a condition of an environment in which the goods are located;

receiving status information, relating to the transmission of a first data packet of the plurality of data packets from the server over a first communication network;

causing the status information relating to the transmission of the first data packet to be analyzed to determine whether the transmission of the first data packet has failed to meet a communication threshold;

in response to determining that the transmission of the first data packet failed to meet the communication threshold, establishing a connection to the server through a second communication network for transmission of a second data packet of the plurality of data packets, wherein the connection to the server through the second communication network is established based on a network connection quality of the second communication network, wherein the network connection quality is determined by comparing at least one of a network throughput, a network reliability, or a network bandwidth of the second communication network to a respective predefined limits;

altering the second data packet, based on the determined network connection quality, wherein altering comprises:

determining whether the telemetry data included in the second data packet exceeds at least one of a minimum parameter or a maximum parameter;

in response to determining that the telemetry data exceeds at least one of the minimum parameter or the maximum parameter, dividing the second data packet into a first portion and a second portion, wherein the first portion of the second data packet comprises contextual information associated with the telemetry data included in the second data packet, wherein the contextual information is indicative of one or more alarms corresponding to telemetry data exceeding at least one of the minimum parameter or the maximum parameter, and actions to be performed based on the telemetry data, wherein the second portion of the second data packet includes the telemetry data, and wherein a first size of the payload in the first portion of the second data packet is less than a second size of the payload in the second portion of the second data packet;

transmitting the first portion of the second data packet over the second communication network; and transmitting the second portion of the second data packet in response to reestablishing the connection with the server through the first communication network.

2. The method for monitoring and tracking goods flowing through a supply chain according to claim 1, wherein the telemetry data includes at least one of the following conditions of the goods or the environment in which the goods are located: temperature, pressure, humidity, shock, tilt, speed, direction, acceleration, ambient light, or orientation.

3. The method for monitoring and tracking goods flowing through a supply chain according to claim 1, wherein the plurality of data packets further includes a monitoring node identifier (MID) corresponding to the monitoring node, wherein the MID comprises a private token unique to the monitoring node.

4. The method for monitoring and tracking goods flowing through a supply chain according to claim 1, wherein the plurality of data packets further include one or more alarms corresponding to minimum or maximum limits of the telemetry data measured by a monitoring node regarding the goods or the environment in which the goods are located.

5. The method for monitoring and tracking goods flowing through a supply chain according to claim 1, wherein the transmission of the first data packet is determined to be unsatisfactory when at least one of a length of time for transmission of the first data packet to the server over the first communication network, an amount of the first data packet that was received by the server over the first communication network, or a condition of the first data packet that was received by the server over the first communication network is insufficient for transmitting at least the first portion of the second data packet to the server.

6. The method for monitoring and tracking goods flowing through a supply chain according to claim 1, further comprising searching for the second communication network by analyzing alternate communication networks for an ability to transmit at least the first portion of the second data packet.

7. The method for monitoring and tracking goods flowing through a supply chain according to claim 1, wherein determining the network bandwidth that the second communication network is configured to transmit comprises measuring the network bandwidth of the second communication network.

8. The method for monitoring and tracking goods flowing through a supply chain according to claim 1, wherein dividing the second data packet into the first portion and the second portion comprises processing the second data packet locally to determine the contextual information associated with the telemetry data included in the second data packet; and generating the first portion comprising the contextual information to be transmitted over the second communication network.

9. The method for monitoring and tracking goods flowing through a supply chain according to claim 1, wherein the contextual information comprises a monitoring node identifier (MID) corresponding to the monitoring node, wherein the MID comprises a private token unique to the monitoring node; one or more alarms corresponding to telemetry data measured by the monitoring node; or a combination thereof.

10. The method for monitoring and tracking goods flowing through a supply chain according to claim 1, further comprising reestablishing the connection to the first communication network for transmission of a third data packet over the first communication network.

11. A communication device comprising:
a receiver configured to receive telemetry data regarding at least one of the communication device or an environment in which the communication device is located, the telemetry data forming a plurality of data packets;
a transmitter configured to transmit a first data packet of the plurality of data packets to a server over a first communication network;
wherein the receiver is further configured to receive status information relating to the transmission of the first data packet to the server over the first communication network; and
a processor in communication with the receiver and the transmitter, wherein the processor is configured to:
cause the status information relating to the transmission of the first data packet to be analyzed to determine whether the transmission of the first data packet failed to meet a communication threshold;
in response to determining that the transmission of the first data packet failed to meet the communication threshold, establish a connection to the server through a second communication network for transmission of a second data packet, wherein the connection to the server through the second communication network is established based on a network connection quality of the second communication network, wherein the network connection quality is determined by comparing at least one of a network throughput, a network reliability, or a network bandwidth of the second communication network to a respective predefined limit;
alter the second data packet, based on the determined network connection quality, wherein the altering comprises:
determine whether the telemetry data included in the second data packet exceeds at least one of a minimum parameter or a maximum parameter;
in response to determining that the telemetry data exceeds at least one of the minimum parameter or the maximum parameter, divide the second data packet into a first portion and a second portion, wherein the first portion comprises contextual information associated with the telemetry data included in the second data packet,
wherein the contextual information is indicative of one or more alarms corresponding to the telemetry data exceeding at least one of the minimum parameter or the maximum parameter of the telemetry data, and actions to be performed based on the telemetry data, wherein the second portion of the second data packet includes the telemetry data, and wherein a first size of the payload in the first portion of the second data packet is less than a second size of the payload in the second portion of the second data packet;

cause transmission of the first portion of the second data packet over the second communication network to the server instead of the full second data packet and the second portion of the second data packet; and cause transmission of the second portion of the second data packet in response to reestablishing the connection with the server through the first communication network.

12. The communication device of claim 11, wherein the contextual information comprises a monitoring node identifier (MID) corresponding to a monitoring node, wherein the MID comprises a private token unique to the monitoring node.

13. The communication device of claim 11, wherein the contextual information comprises one or more alarms corresponding to minimum or maximum limits of the telemetry data measured by a monitoring node regarding goods associated with the communication device or the environment in which the goods are located.

14. The communication device of claim 11, wherein the telemetry data comprises at least one of: temperature, pressure, humidity, shock, tilt, speed, direction, acceleration, ambient light, or orientation.

15. The communication device of claim 11, wherein the processor is configured to cause the status information relating to the transmission of the first data packet to be analyzed to determine whether the transmission of the first data packet failed to meet the communication threshold by communicating with the server, wherein the server determines whether at least one of a length of time for transmission of the first data packet to the server over the first communication network, an amount of the first data packet that was received by the server over the first communication network, or a condition of the first data packet that was received by the server over the first communication network is unsatisfactory for transmitting at least the second data packet to the first communication network.

16. The communication device of claim 11, wherein the processor is configured to search for the second communication network by analyzing alternate communication networks for an ability to transmit at least the first portion of the second data packet.

17. The communication device of claim 11, wherein the processor is configured to determine the network bandwidth by measuring the network bandwidth of the second communication network.

18. The communication device of claim 11, wherein the processor is configured to store the telemetry data from the second data packet until reconnection to the first communication network.

19. The communication device of claim 11, wherein dividing the second data packet into the first portion and the second portion comprises processing the second data packet locally to determine the contextual information associated with the telemetry data included in the second data packet, and generating the first portion of the second data packet comprising the contextual information to be transmitted over the second communication network.

20. The communication device of claim 11, wherein the processor is further configured to reestablish a connection to the first communication network for transmission of a third data packet over the first communication network by reconnecting to the first communication network.

* * * * *